US009548971B2

(12) United States Patent
Jalisatgi et al.

(10) Patent No.: US 9,548,971 B2
(45) Date of Patent: Jan. 17, 2017

(54) SYSTEMS AND METHODS FOR SMART CIPHER SELECTION

(71) Applicant: Symantec Corporation, Mountain View, CA (US)

(72) Inventors: Pradeep Jalisatgi, Bangalore (IN); Alok Naik, Bangalore (IN)

(73) Assignee: Symantec Corporation, Mountain View, CA (US)

( * ) Notice: Subject to any disclaimer, the term of this patent is extended or adjusted under 35 U.S.C. 154(b) by 42 days.

(21) Appl. No.: 14/268,137

(22) Filed: May 2, 2014

(65) Prior Publication Data
US 2015/0271145 A1  Sep. 24, 2015

(30) Foreign Application Priority Data

Mar. 19, 2014 (IN) .............................. 345/KOL/2014

(51) Int. Cl.
*H04L 29/06* (2006.01)
*H04L 29/08* (2006.01)

(52) U.S. Cl.
CPC ....... *H04L 63/0428* (2013.01); *H04L 67/1004* (2013.01); *H04L 67/42* (2013.01)

(58) Field of Classification Search
USPC ...................................... 726/22–25; 713/168
See application file for complete search history.

(56) References Cited

U.S. PATENT DOCUMENTS

| | | | | |
|---|---|---|---|---|
| 6,704,608 B1 * | 3/2004 | Azuma | ............... | G06K 19/0707 340/4.62 |
| 7,506,368 B1 * | 3/2009 | Kersey | ................ | H04L 63/0428 726/12 |
| 7,895,448 B1 * | 2/2011 | Satish | ................... | G06F 21/577 713/187 |
| 8,667,279 B2 * | 3/2014 | Rao | ..................... | H04N 7/17318 380/201 |
| 2004/0133778 A1 * | 7/2004 | Madani | ................... | G06F 21/36 713/168 |
| 2005/0198490 A1 * | 9/2005 | Jaganathan et al. | .......... | 713/151 |

(Continued)

OTHER PUBLICATIONS

Automatic Resource Scaling Based on Application Service Requirements, Lin et al, 2012 IEEE 5th International Conference, Jun. 24-29, 2012.*

(Continued)

*Primary Examiner* — Luu Pham
*Assistant Examiner* — Jahangir Kabir
(74) *Attorney, Agent, or Firm* — FisherBroyles LLC

(57) ABSTRACT

A computer-implemented method for smart cipher selection may include (1) receiving, at a server and from a client, a request to communicate according to a cipher for encryption, the request containing a client list of ciphers available at the client, (2) identifying a server list of ciphers available at the server, (3) measuring, in response to receiving the request, a resource load at the server and a risk factor indicating a degree of risk posed by the client, and (4) selecting a common cipher, from the client list and the server list, for encrypted communication based on the measured resource load at the server and the measured risk factor indicating the degree of risk posed by the client. Various other methods, systems, and computer-readable media are also disclosed.

20 Claims, 7 Drawing Sheets

(56) References Cited

U.S. PATENT DOCUMENTS

2010/0325412 A1* 12/2010 Norrman ................ G06Q 10/06
                                                          713/100
2011/0154497 A1*  6/2011 Bailey, Jr. ....................... 726/25
2013/0283051 A1* 10/2013 Zigmond .............. H04L 9/0822
                                                          713/168
2014/0380484 A1* 12/2014 Choi et al. ...................... 726/25

OTHER PUBLICATIONS

An Approach for Dynamic Scaling of Resources in Enterprise Cloud, Kanagala et al, 2013 IEEE 5th International Conference, Dec. 2-5, 2013.*

* cited by examiner

SYSTEMS AND METHODS FOR SMART CIPHER SELECTION

BACKGROUND

Security is a major concern for many Internet services and applications. Users of social networking websites want to be sure that their private data remains private. Customers using online retailers wish to be assured that their financial information will not be stolen by malicious actors. Organizations require that their sensitive internal data will not be exposed to outsiders while the data is traveling to or from remote servers.

Cryptographic protocols, such as SECURE SOCKET LAYER (SSL) and TRANSPORT LAYER SECURITY (TLS), offer security for data sent over the Internet. SSL, TLS, and similar protocols encrypt messages sent between servers and clients, reducing the risk that any malicious third party who intercepts the message will be able to extract valuable data. However, such encryption comes at the cost of higher processing power and increased server load. The more complex the cipher, the safer the encrypted message may be, but also, the higher the potential burden on system resources.

Traditional systems for selecting ciphers may choose the first cipher in a list of ciphers on a server that matches a cipher in a list of ciphers sent by a client making a request of that server. This may be the most secure cipher but may require more processing power than the server has available. Some traditional systems may slow down or even refuse connections from the server when processing a high number of requests that use complex ciphers. In some cases, the ciphers selected by traditional systems may be more complex than necessary to ensure the safety of the message. Accordingly, the instant disclosure identifies and addresses a need for additional and improved systems and methods for selecting ciphers.

SUMMARY

As will be described in greater detail below, the instant disclosure generally relates to systems and methods for smart cipher selection by, for example, choosing less complex ciphers when server load is higher, unless a client is identified as risky and thus may benefit from a more secure cipher. In one example, a method for smart cipher selection may include (1) receiving, at a server and from a client, a request that seeks to communicate according to a cipher for encryption and that contains a client list of ciphers available at the client, (2) identifying a server list of ciphers available at the server, (3) measuring, in response to receiving the request, a resource load at the server and a risk factor indicating a degree of risk posed by the client, and (4) selecting a common cipher, from the client list and the server list, for encrypted communication based on the measured resource load at the server and the measured risk factor indicating the degree of risk posed by the client.

In some examples, measuring the resource load at the server may include determining that the resource load at the server exceeds a predefined threshold for server resource load. In one embodiment, the predefined threshold may be one of a set of predefined thresholds correlated with a set of server resource loads and selecting the common cipher for encrypted communication may include selecting the common cipher based on which of the set of predefined thresholds the resource load at the server exceeds.

In one embodiment, the measured resource load at the server may include a central processing unit (CPU) load. Additionally or alternatively, the measured resource load at the server may measure (1) hard drive access, (2) available random access memory, (3) processor heating, (4) use of virtual machines, and/or (5) open process threads.

In some examples, selecting the common cipher for encrypted communication may include identifying a required resource load for the common cipher and determining whether the measured resource load satisfies the required resource load. In some examples, the computer-implemented method may further include categorizing each cipher in the server list of ciphers according to a required resource load for the cipher.

In some examples, selecting the common cipher may include determining that the measured risk factor exceeds a predetermined threshold for risk posed by the client and disallowing use of a cipher categorized below a safety threshold based on the determination that the measured risk factor exceeds the predetermined threshold for risk posed by the client. Additionally or alternatively, selecting the common cipher may include determining that the measured risk factor does not exceed a predetermined threshold for risk posed by the client and allowing use of a cipher categorized below a safety threshold based on the determination that the measured risk factor does not exceed the predetermined threshold for risk posed by the client. In a further embodiment, the risk factor indicating the degree of risk posed by the client may be based on a geolocation of the client, an Internet protocol address of the client, and/or a time of day of the request from the client.

In one example, a system for implementing the above-described method may include (1) a receiving module, stored in memory, that receives, at a server and from a client, a request that seeks to communicate according to a cipher for encryption and that contains a client list of ciphers available at the client, (2) an identification module, stored in memory, that identifies a server list of ciphers available at the server, (3) a measuring module, stored in memory, that measures, in response to receiving the request, a resource load at the server and a risk factor indicating a degree of risk posed by the client, (4) a selection module, stored in memory, that selects a common cipher, from the client list and the server list, for encrypted communication based on the measured resource load at the server and the measured risk factor indicating the degree of risk posed by the client, and (5) at least one physical processor configured to execute the receiving module, the identification module, the measuring module, and the selection module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) receive, at a server and from a client, a request that seeks to communicate according to a cipher for encryption and that contains a client list of ciphers available at the client, (2) identify a server list of ciphers available at the server, (3) measure, in response to receiving the request, a resource load at the server and a risk factor indicating a degree of risk posed by the client, and (4) select a common cipher, from the client list and the server list, for encrypted communication based on the measured resource load at the server and the measured risk factor indicating the degree of risk posed by the client.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
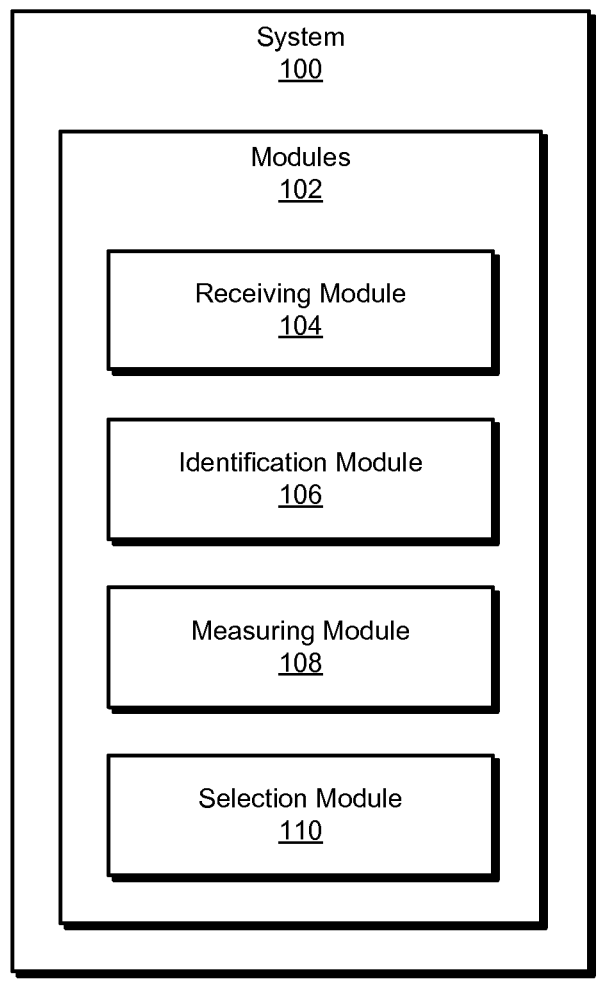
FIG. 1 is a block diagram of an exemplary system for smart cipher selection.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for smart cipher selection. As will be explained in greater detail below, the disclosed systems and methods may enable servers to process requests more efficiently without compromising security. By basing cipher suite selection on server load rather than defaulting to the most secure but processing-intensive cipher suite, the systems described herein may allow servers to process more requests while requiring fewer resources and reducing the chances that requests will be ignored by overloaded servers. Because the systems described herein may also consider client risk factors when determining which cipher suite to use, message security may not be compromised.

Figure 2:
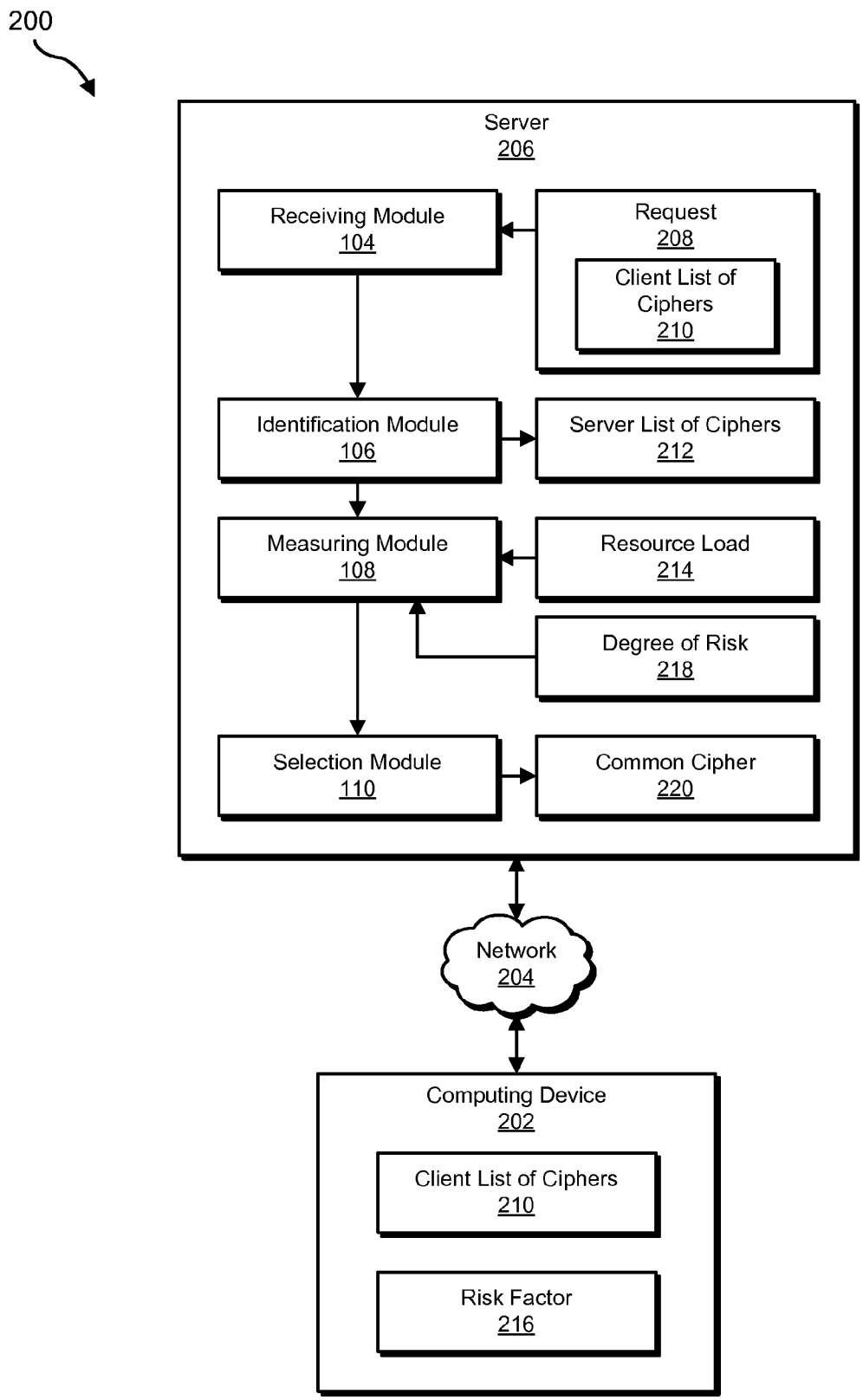
FIG. 2 is a block diagram of an additional exemplary system for smart cipher selection.
Figure 3:
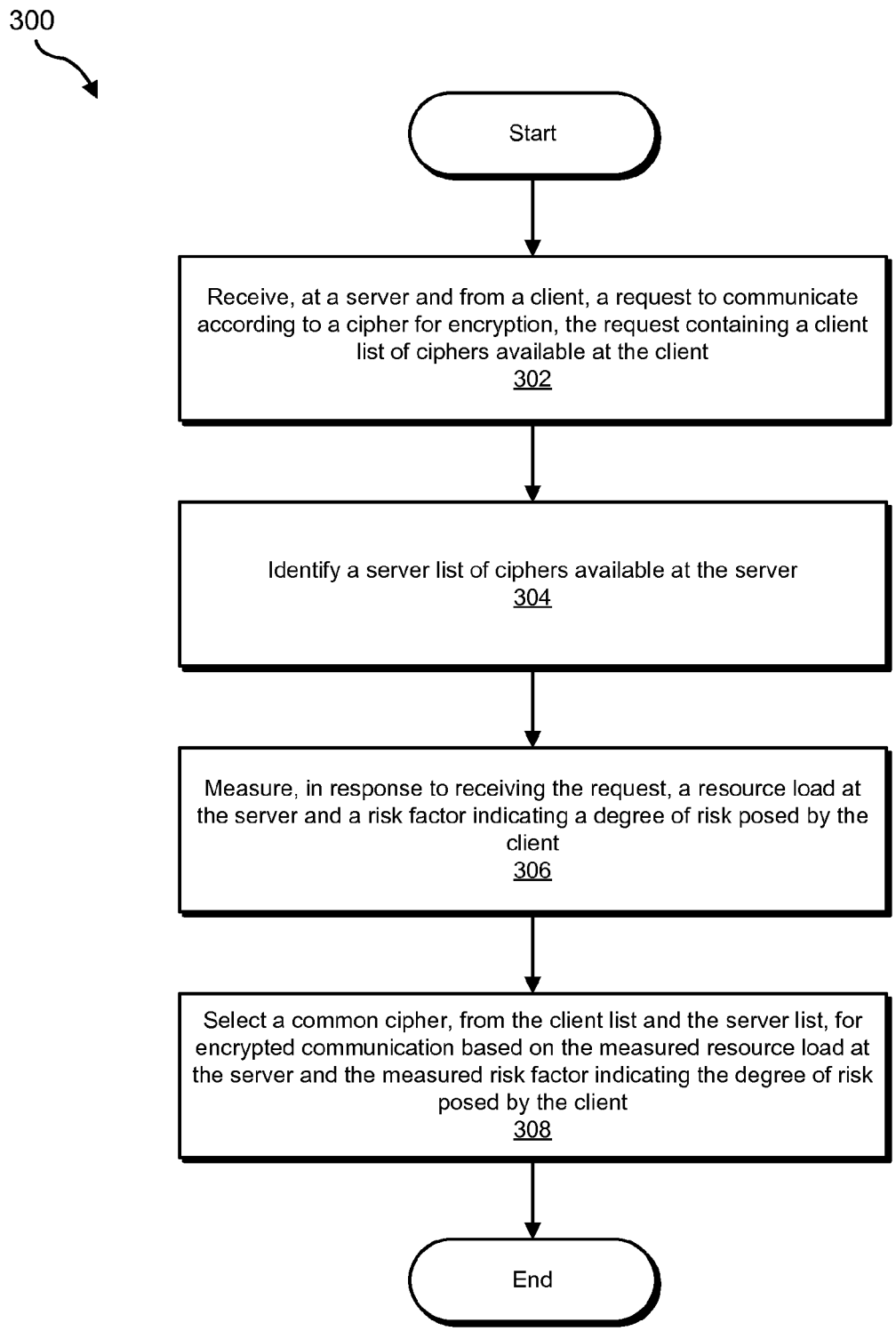
FIG. 3 is a flow diagram of an exemplary method for smart cipher selection.
Figure 4:
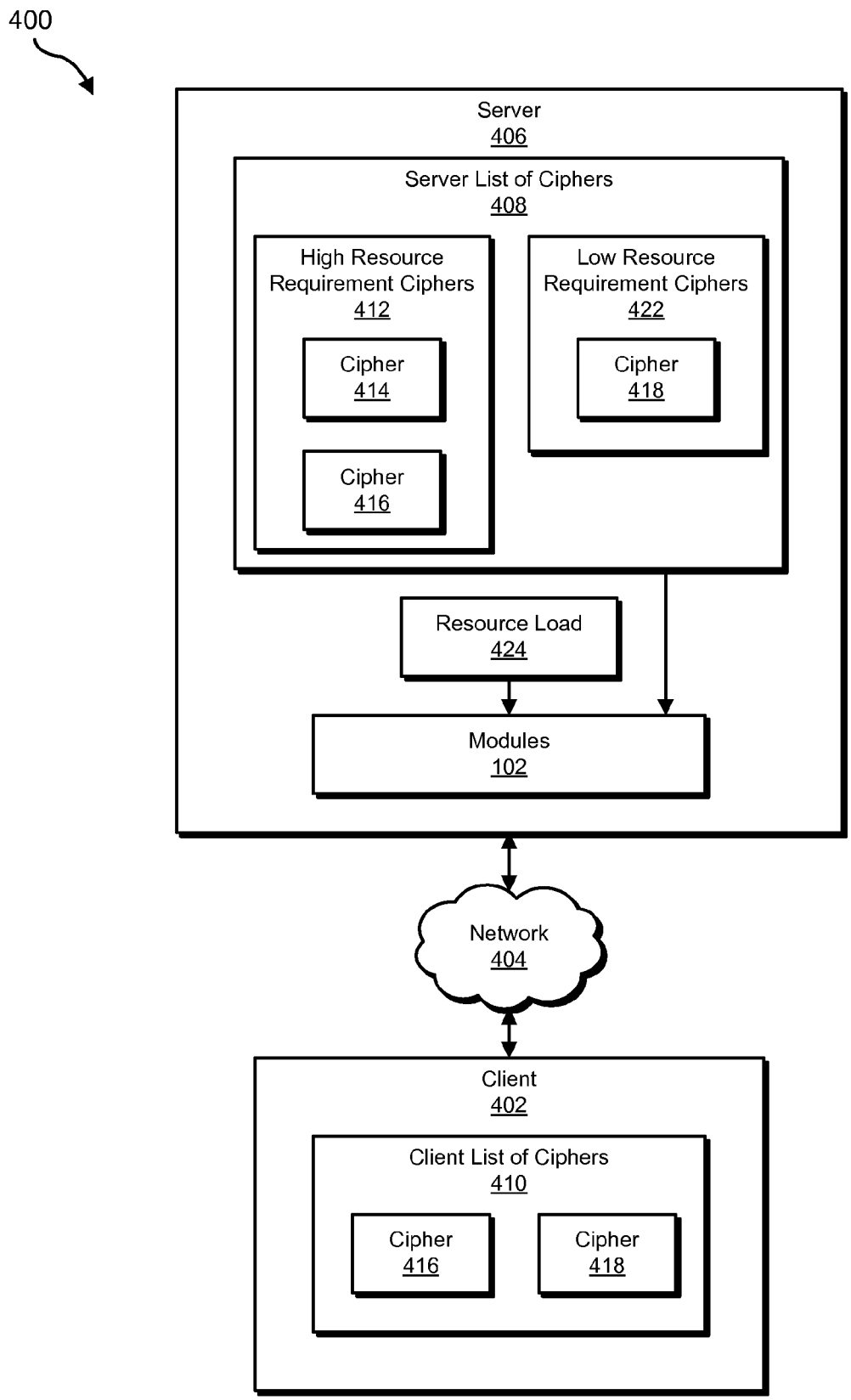
FIG. 4 is a block diagram of an exemplary computing system for smart cipher selection.

The following will provide, with reference to FIGS. 1, 2, and 4, detailed descriptions of exemplary systems for smart cipher selection. Detailed descriptions of corresponding computer-implemented methods will also be provided in connection with FIGS. 3 and 5. In addition, detailed descriptions of an exemplary computing system and network architecture capable of implementing one or more of the embodiments described herein will be provided in connection with FIGS. 6 and 7, respectively.

FIG. 1 is a block diagram of exemplary system 100 for smart cipher selection. As illustrated in this figure, exemplary system 100 may include one or more modules 102 for performing one or more tasks. For example, and as will be explained in greater detail below, exemplary system 100 may include a receiving module 104 that may receive, at a server and from a client, a request that seeks to communicate according to a cipher for encryption and that contains a client list of ciphers available at the client. Exemplary system 100 may additionally include an identification module 106 that may identify a server list of ciphers available at the server. Exemplary system 100 may also include a measuring module 108 that may measure, in response to receiving the request, a resource load at the server and a risk factor indicating a degree of risk posed by the client. Exemplary system 100 may additionally include a selection module 110 that may select a common cipher, from the client list and the server list, for encrypted communication based on the measured resource load at the server and the measured risk factor indicating the degree of risk posed by the client. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or server 206), computing system 610 in FIG. 6, and/or portions of exemplary network architecture 700 in FIG. 7. One or more of modules 102 in FIG. 1 may also represent all or portions of one or more special-purpose computers configured to perform one or more tasks.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a server 206 via a network 204. In one example, computing device 202 may be programmed with one or more of modules 102. Additionally or alternatively, server 206 may be programmed with one or more of modules 102.

In one embodiment, one or more of modules 102 from FIG. 1 may, when executed by at least one processor of computing device 202 and/or server 206, enable computing device 202 and/or server 206 to perform smart cipher selection. For example, and as will be described in greater detail below, one or more of modules 102 may cause computing device 202 and/or server 206 to perform smart cipher selection. For example, and as will be described in greater detail below, receiving module 104 may receive, at server 206 and from computing device 202, a request 208 to communicate according to a cipher for encryption, and request 208 may contain a client list of ciphers 210 available at computing device 202. After request 208 has been received, identification module 106 may identify a server list of ciphers 212 available at server 206. Next, measuring module 108 may measure, in response to receiving request 208, a resource load 214 at server 206 and a risk factor 216 indicating a degree of risk 218 posed by computing device 202. Finally, selection module 110 may select a common cipher 220, from client list of ciphers 210 and server list of ciphers 212, for encrypted communication based on the measured resource load 214 at server 206 and the measured risk factor 216 indicating degree of risk 218 posed by computing device 202.

For example, server 206 may receive request 208 as well as numerous other requests. In some examples, server 206 may also be performing other tasks. Systems described herein may measure resource load 214 and determine that server 206 is near its total capacity and processing may be slowed down. In some examples, server 206 may be unable to reply to further requests due to resource load 214 being excessively high. In order to avoid this problem, systems described herein may select a cipher that requires relatively little processing power, allowing server 206 to continue responding to requests despite resource load 214. However, in some examples computing device 202 may possess risk factor 216 that may indicate that degree of risk 218 is too high to make a low complexity cipher a secure choice. In these examples, systems described herein may select a high complexity cipher despite resource load 214. This method of selecting common cipher 220 may allow server 206 to process a greater number of requests without compromising security.

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, exemplary computing system 610 in FIG. 6, or any other suitable computing device.

Server 206 generally represents any type or form of computing device that is capable of processing encrypted communication using a cipher. Examples of server 206 include, without limitation, application servers and database servers configured to provide various database services and/or run certain software applications.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 700 in FIG. 7, or the like. Network 204 may facilitate communication or data transfer using wireless or wired connections. In one embodiment, network 204 may facilitate communication between computing device 202 and server 206.

FIG. 3 is a flow diagram of an exemplary computer-implemented method 300 for smart cipher selection. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 610 in FIG. 6, and/or portions of exemplary network architecture 700 in FIG. 7.

As illustrated in FIG. 3, at step 302 one or more of the systems described herein may receive, at a server and from a client, a request to communicate according to a cipher for encryption. The request may contain a client list of ciphers available at the client. For example, at step 302 receiving module 104 may, as part of server 206 in FIG. 2, receive, at server 206 and from computing device 202, request 208 to communicate according to a cipher for encryption, and request 208 may contain client list of ciphers 210 that are available at computing device 202.

The term "cipher," as used herein, generally refers to any method of encrypting or otherwise obscuring a message. A cipher may be part of a cipher suite used for encrypting communications between computing systems. For example, a cipher suite may include authentication and/or encryption algorithms used by TLS and/or SSL network protocols. Examples of ciphers may include, without limitation, DATA ENCRYPTION STANDARD (DES), 3DES, ADVANCED ENCRYPTION STANDARD (AES) 256, RC4, and/or AES-128.

The term "request," as used herein, generally refers to any message sent between two or more computing devices. In some embodiments, a request may include a hypertext transfer protocol (HTTP) secure request from a client to a server. A request may include a list of ciphers supported by the client, a session identifier, a random number, and/or an encrypted secret used for key generation. In some embodiments, only the first request of a session may include a list of supported ciphers.

Receiving module 104 may receive the request in a variety of ways and contexts. For example, receiving module 104 may be located on a server and may have access to requests received by the server. In another example, receiving module 104 may be located on a proxy that intercepts requests directed to a server. In some examples, receiving module 104 may be located on a server configured to process HTTP secure requests.

At step 304, one or more of the systems described herein may identify a server list of ciphers available at the server. For example, at step 304 identification module 106 may, as part of server 206 in FIG. 2, identify server list of ciphers 212 available at server 206.

Identification module 106 may identify the server list of ciphers in a variety of ways. For example, identification module 106 may identify a list of ciphers configured by an administrator to be used by a server.

In some embodiments, the systems described herein may categorize each cipher in the server list of ciphers according to a required resource load for the cipher. For example, ciphers may be categorized into low, medium, and/or high resource load requirement categories. In one example, a low category may include 3DES and/or DES, a medium category may include AES-256, and/or a high category may include RC4 and/or AES-128. In some examples, ciphers may be divided into various other numbers of categories. For example, ciphers may be divided into two categories, five categories, and/or ten categories.

At step 306, one or more of the systems described herein may measure, in response to receiving the request, a resource load at the server and a risk factor indicating a degree of risk posed by the client. For example, at step 306 measuring module 108 may, as part of server 206 in FIG. 2, measure, in response to receiving request 208, resource load 214 at server 206 and risk factor 216 indicating degree of risk 218 posed by computing device 202.

The term "resource load," as used herein, generally refers to any measurement of the use of one or more systems on a computing device. In some examples, the resource load may include the utilization of resources on a server. In one embodiment, measuring module 108 may measure resource load at the server by measuring a CPU load. Additionally or alternatively, measuring module 108 may measure hard drive access (e.g., I/O frequency or load), available random access memory, nonvolatile memory, or other memory, processor heating, network usage or bandwidth, use of virtual machines, and/or open process threads on a server.

Measuring module 108 may measure the resource load on the server in a variety of ways and contexts. For example, measuring module 108 may be configured to constantly monitor the resource load on the server. In another example, measuring module 108 may measure the resource load on the server whenever a request is received. In one example, measuring module 108 may include a script configured to measure the resource load on the server. Additionally or alternatively, measuring module 108 may include hardware components such as a thermometer.

Measuring module 108 may measure resource load 214 and risk factor 216 in any order. Notably, in alternative embodiments, measuring module 108 may measure only one of resource load 214 and risk factor 216, and measuring module 108 may then determine that measurement of the other is not needed or desired. For example, measuring module 108 may first measure resource load 214 and determine that the load is light or below a threshold, such that measuring risk factor 216 is not necessary (e.g., a high resource or intense cipher may be used regardless of risk factor 216). Similarly, measuring module 108 may first measure risk factor 216 and determine that the risk is great or above a threshold, such that measuring resource load 214 is not necessary (e.g., a high resource or intense cipher may be used regardless of resource load 214).

In some examples, measuring module 108 may measure the resource load at the server by determining that the resource load at the server exceeds a predefined threshold for server resource load. A predefined threshold may be absolute and/or may specify a percentage of resource capacity. In one example, measuring module 108 may determine that a CPU utilization of 95% exceeds a predetermined threshold for CPU utilization of 90%. In another example, measuring module 108 may determine that a processor temperature of 60 degrees Celsius exceeds a predetermined threshold for temperature of 50 degrees Celsius.

In one embodiment, the predefined threshold may include one of a set of predefined thresholds correlated with a set of server resource loads and selecting the common cipher for encrypted communication may include selecting the common cipher based on which of the set of predefined thresholds the resource load at the server exceeds. For example, a set of predefined thresholds for resource load may include a medium threshold at 70% CPU utilization and/or a high threshold at 90% CPU utilization. In this example, if measuring module 108 measures CPU utilization at 75%, exceeding the medium threshold but not the high threshold, systems described herein may select a cipher that requires a medium amount of CPU power. If measuring module 108 measures CPU utilization at 40%, exceeding neither threshold, systems described herein may select a cipher that requires a high amount of CPU power. If measuring module 108 measures CPU utilization at 96%, exceeding the high threshold in this example, systems described herein may select a cipher that requires a low amount of CPU power.

The term "risk factor," as used herein, generally refers to any characteristic of a message and/or computing system that may indicate an increased likelihood that the message and/or computing system may be subject to attacks. In some embodiments, a risk factor may include an attribute of a client and/or request from a client that may be identified based on an HTTP and/or HTTP secure request. Examples of items that may indicate, or reveal, risk factors may include, without limitation, geolocation of a client, Internet protocol address of a client, time of day of a request, reputation of a client, interaction history with a client, formatting of a request, and/or content of a request.

In one embodiment, measuring module 108 may measure the risk factor indicating the degree of risk posed by the client by determining a geolocation of the client. For example, measuring module 108 may determine that the client is located in a region more prone to attacks. In one embodiment, measuring module 108 may measure the risk factor indicating the degree of risk posed by the client by determining an Internet protocol address of the client. For example, measuring module 108 may check the Internet protocol address of the client against a list of Internet protocol addresses of clients flagged for more stringent security measures. Additionally or alternatively, measuring module 108 may measure the risk factor indicating the degree of risk posed by the client in part by determining a time of day of the request from the client. For example, measuring module 108 may determine that it is currently the middle of the night where the client is located and that attacks may be more likely during this time.

At step 308, one or more of the systems described herein may select a common cipher, from the client list and the server list, for encrypted communication based on the measured resource load at the server and the measured risk factor indicating the degree of risk posed by the client. For example, at step 308 selection module 110 may, as part of server 206 in FIG. 2, select common cipher 220, from client list of ciphers 210 and server list of ciphers 212, for encrypted communication based on measured resource load 214 at server 206 and measured risk factor 216 indicating degree of risk 218 posed by computing device 202. As used herein, the term "common cipher" generally refers to a cipher available on both a client list and a server list of ciphers.

Selection module 110 may select the cipher based on a variety of criteria. For example, selection module 110 may select the cipher by first determining how many resources are available on the server and then choosing a cipher from an appropriate category based on resource requirements. FIG. 4 is a block diagram of an exemplary computing system 400 for smart cipher selection based on cipher resource requirements. As illustrated in FIG. 4, server 406 may communicate with client 402 via network 404. Server 406 may include server list of ciphers 408 that may include high resource requirement ciphers 412 and/or low resource requirement ciphers 422. High resource requirement ciphers 412 may include cipher 414 and/or cipher 416. Low resource requirement ciphers 422 may include cipher 418. Server 406 may also include resource load 424 and/or modules 102.

Client 402 may include client list of ciphers 410 that may include cipher 416 and/or cipher 418. Systems described herein may measure resource load 424 and/or may determine that resource load 424 exceeds a predetermined threshold for server resource load. Selection module 110 may select cipher 418 from low resource requirement ciphers 422 based on measured resource load 424 exceeding the predetermined threshold and cipher 418 being present in client list of ciphers 410. If resource load 424 does not exceed the predetermined threshold, selection module 110 may instead select cipher 416 from high resource requirement ciphers 412.

In some examples, selection module 110 may select the common cipher for encrypted communication by identifying a required resource load for the common cipher and determining whether the measured resource load satisfies the required resource load. For example, AES-128 may require 2% of the CPU cycles available on a server. In this example, the server may be at 50% CPU utilization and thus may have ample available CPU cycles for the AES-128 cipher.

In some examples, selection module 110 may select the common cipher by determining that the measured risk factor exceeds a predetermined threshold for risk posed by the client and disallowing use of a cipher categorized below a safety threshold based on the determination that the measured risk factor exceeds the predetermined threshold. For example, a client may have a geolocation that is associated with a high risk of attacks that may be above the predetermined threshold of a moderate attack risk for geolocations. In this example, selection module 110 may disallow the use of a low complexity cipher for communications with the client. In some examples, selection module 110 may use multiple risk thresholds to make cipher selections. For example, selection module 110 may disallow the use of low and/or medium complexity ciphers for clients that exceed a high threshold for risk and/or may disallow the use of low complexity ciphers for clients that exceed a moderate threshold for risk.

In some examples, selection module 110 may select the common cipher by determining that the measured risk factor does not exceed a predetermined threshold for risk posed by the client and allowing use of a cipher categorized below a safety threshold based on the determination that the measured risk factor does not exceed the predetermined threshold. For example, a client may have a geolocation that is associated with a low risk of attacks and so selection module 110 may allow the use of a cipher categorized as low complexity.

Figure 5:
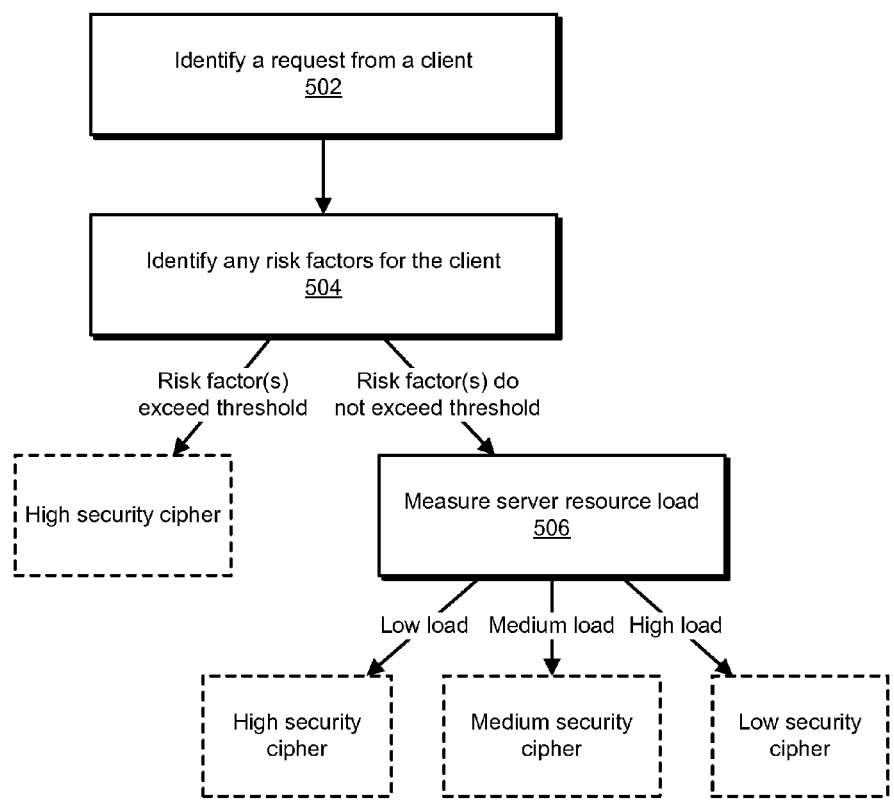
FIG. 5 is a flow diagram of an exemplary method for smart cipher selection.

In some embodiments, selection module 110 may analyze potential risk factors and then analyze server load in order to select the cipher suite. FIG. 5 is a flow diagram of an exemplary method for smart cipher selection. The steps shown in FIG. 5 may be performed by any suitable computer-executable code and/or computing system. In some embodiments, the steps shown in FIG. 5 may be performed by one or more of the components of system 100 in FIG. 1 and/or system 200 in FIG. 2.

As illustrated in FIG. 5, at step 502 the systems described herein may identify a request from a client. In some embodiments, the request may include a HTTP secure request that may include a client list of ciphers. At step 504, the systems described herein may identify any risk factors for the client. Risk factors may include factors such as the geolocation of the client, the IP address of the client, and/or the time of day of the request from the client. If the systems described herein determine that the risk factors exceed a threshold for tolerable risk, a high security cipher may be selected. In some examples, if the risk factors exceed the threshold for tolerable risk systems described herein may select a cipher without measuring server resource load.

At step 506, the systems described herein may measure server resource load. If the server resource load is low, the systems described herein may select a high security cipher. If the server resource load is medium, the systems described herein may select a medium security cipher. If the server resource load is high, the systems described herein may select a low security cipher.

As explained above in connection with method 300 in FIG. 3, the disclosed systems and methods may enable servers to process requests more efficiently without compromising security. By basing cipher suite selection on server load rather than defaulting to the most secure but processing-intensive cipher suite, the systems described herein may allow servers to process more requests while requiring fewer resources and reducing the chances that requests will be ignored by overloaded servers. Because the systems described herein may also consider client risk factors when determining which cipher suite to use, message security may not be compromised.

Figure 6:
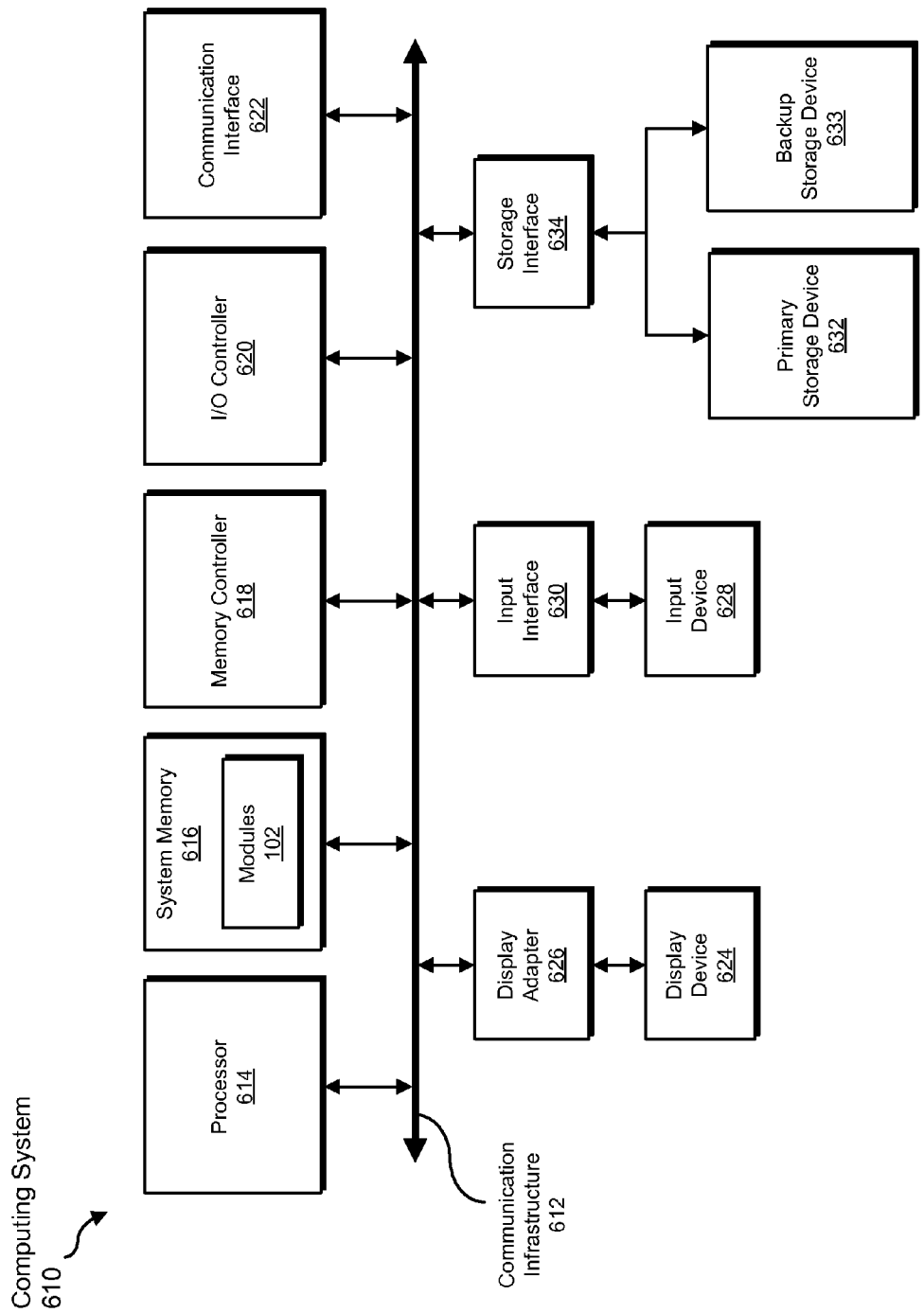
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the exemplary embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an Application Specific Integrated Circuit (ASIC) adapted to implement one or more of the exemplary embodiments disclosed herein.

Figure 7:
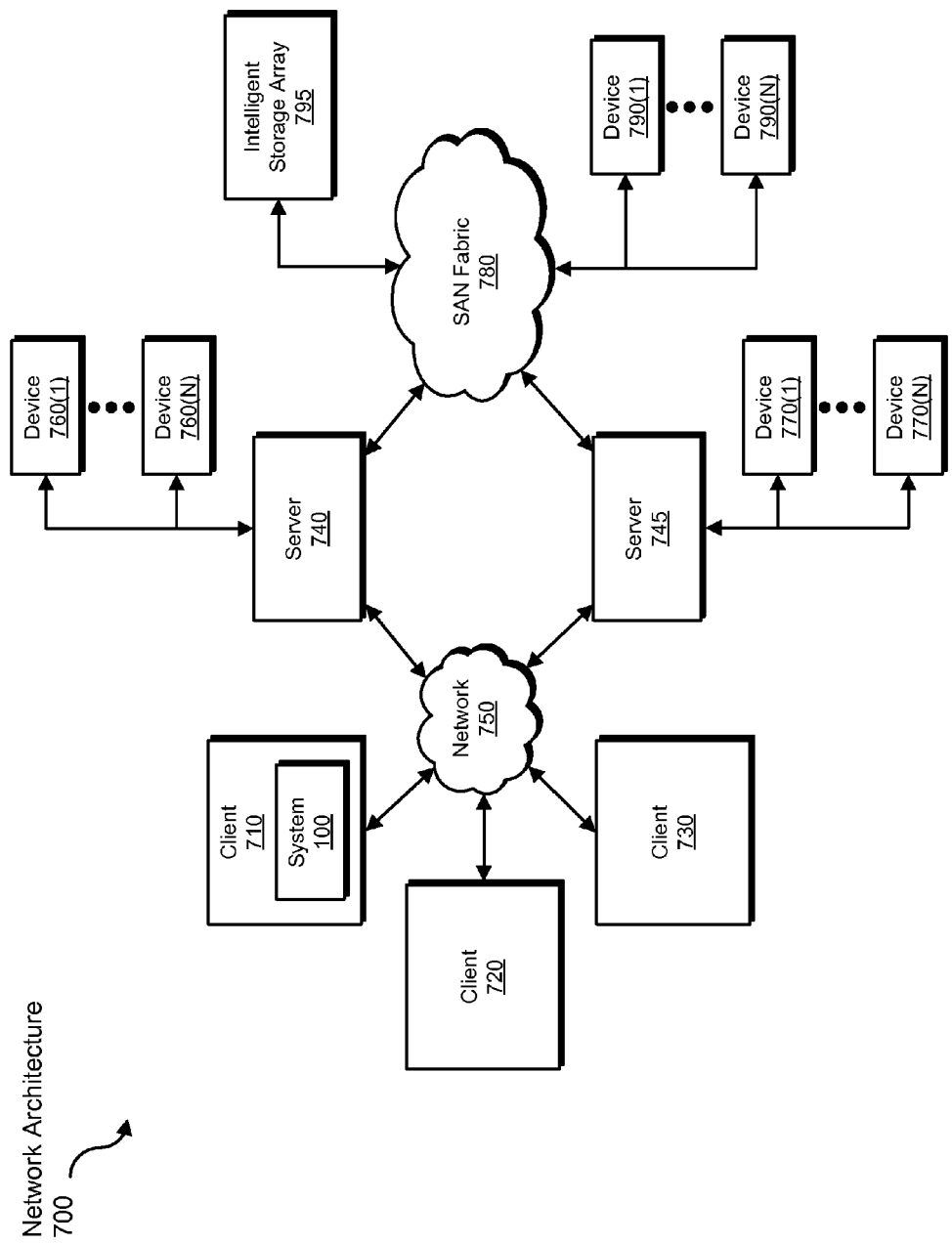
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an exemplary method for smart cipher selection.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the phrase "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the phrase "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the phrase "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the phrase "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the phrase "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive a request, a list of ciphers, a measured risk factor, and/or a measured resource load to be transformed, transform any one or permutation of these, output a result of the transformation to a network message, display, or other output, use the result of the transformation to determine which cipher to use and more efficiently encrypt network communications, and store the result of the transformation to memory, for example. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for smart cipher selection, at least a portion of the method being performed by a computing device comprising at least one processor, the method comprising:
   receiving, at a server and from a client, a request to communicate according to a cipher for encryption, the request containing a client list of ciphers available at the client;
   identifying a server list of ciphers available at the server;

measuring, in response to receiving the request, a risk factor indicating a degree of risk posed by the client, wherein:
    the risk measurement indicates that the risk factor does not exceed a predetermined risk threshold;
    the risk factor comprising at least one of:
        a geolocation of the client;
        an Internet protocol address of the client;
        a time of day of the request from the client;
measuring, in response to receiving the request, a resource load at the server that comprises a measurement of computational processing power at the server;
determining whether the resource-load measurement exceeds a predetermined resource-load threshold;
in response to determining that the resource-load measurement exceeds the predetermined resource-load threshold, selecting from both the client list and the server list a common cipher that has a lower level of complexity than at least one other common cipher for encrypted communication based on both the resource-load measurement exceeding the predetermined resource-load threshold and the risk factor not exceeding the predetermined risk threshold;
in response to determining that the resource-load measurement does not exceed the predetermined resource-load threshold, selecting from both the client list and the server list, based on both the resource-load measurement not exceeding the predetermined resource-load threshold and the risk factor not exceeding the predetermined risk threshold, a common cipher that has a higher level of complexity than the common cipher that would have been selected had the resource-load measurement exceeded the predetermined resource-load threshold;
encrypting communication between the server and the client using the selected common cipher;
transmitting the communication between the server and the client that was encrypted using the selected common cipher.

2. The computer-implemented method of claim 1, wherein:
    the predetermined risk threshold is one of a set of predetermined thresholds correlated with a set of risks posed by clients; and
    selecting the common cipher for encrypted communication comprises selecting the common cipher based at least in part on which of the set of predetermined thresholds the risk factor at the client falls below.

3. The computer-implemented method of claim 1, wherein:
    the predetermined resource-load threshold is one of a set of predetermined thresholds correlated with a set of server resource loads; and
    selecting the common cipher for encrypted communication comprises selecting the common cipher based at least in part on which of the set of predetermined thresholds the resource load at the server exceeds.

4. The computer-implemented method of claim 1, wherein selecting the common cipher for encrypted communication comprises:
    identifying a required resource load for the common cipher; and
    determining whether the resource-load measurement satisfies the required resource load.

5. The computer-implemented method of claim 1, further comprising categorizing each cipher in the server list of ciphers according to a required resource load for the cipher.

6. The computer-implemented method of claim 1, wherein the risk factor indicating the degree of risk posed by the client comprises a reputation of the client.

7. The computer-implemented method of claim 1, wherein selecting the common cipher comprises allowing use of a cipher categorized below a safety threshold based on the risk measurement indicating that the risk factor does not exceed the predetermined risk threshold.

8. The computer-implemented method of claim 1, wherein the geolocation of the client comprises a geolocation that is absent from a predetermined list of non-secure geolocations.

9. The computer-implemented method of claim 1, wherein the Internet protocol address of the client comprises an Internet protocol address that is absent from a predetermined list of suspicious Internet protocol addresses.

10. The computer-implemented method of claim 1, wherein the time of day of the request from the client falls within a predetermined range of times of day designated as low-risk times of day.

11. The computer-implemented method of claim 1, wherein the measured resource load at the server comprises a central processing unit load.

12. The computer-implemented method of claim 1, wherein the resource-load measurement measures at least one of:
    hard drive access;
    available random access memory;
    processor heating;
    use of virtual machines; and
    open process threads.

13. A system for smart cipher selection, the system comprising:
    a receiving module, stored in memory, that receives, at a server and from a client, a request to communicate according to a cipher for encryption, the request containing a client list of ciphers available at the client;
    an identification module, stored in memory, that identifies a server list of ciphers available at the server;
    a measuring module, stored in memory, that performs the following in response to receiving the request:
        measures a risk factor indicating a degree of risk posed by the client, wherein:
            the risk measurement indicates that the risk factor does not exceed a predetermined risk threshold;
            the risk factor comprising at least one of:
                a geolocation of the client;
                an Internet protocol address of the client;
                a time of day of the request from the client;
        measures, in response to receiving the request, a resource load at the server that comprises a measurement of computational processing power at the server;
        determines whether the resource-load measurement exceeds a predetermined resource-load threshold;
    a selection module, stored in memory, that:
        in response to determining that the resource-load measurement exceeds the predetermined resource-load threshold, selects from both the client list and the server list a common cipher that has a lower level of complexity than at least one other common cipher for encrypted communication based on both the resource-load measurement exceeding the predetermined resource-load threshold and the risk factor not exceeding the predetermined risk threshold;
        in response to determining that the resource-load measurement does not exceed the predetermined resource-load threshold, selects from both the client list and the server list, based on both the resource-load measurement not exceeding the predetermined resource-load threshold and the risk factor not exceeding the predetermined risk threshold, a common cipher that has a higher level of complexity than the common cipher that would have been selected had the resource-load measurement exceeded the predetermined resource-load threshold;

encrypts communication between the server and the client using the selected common cipher;

transmits the communication between the server and the client that was encrypted using the selected common cipher;

at least one physical processor configured to execute the receiving module, the identification module, the measuring module, and the selection module.

14. The system of claim 13, wherein:
the predetermined risk threshold is one of a set of predetermined thresholds correlated with a set of risks posed by clients; and
the selection module selects the common cipher for encrypted communication by selecting the common cipher based at least in part on which of the set of predetermined thresholds the risk factor at the client falls below.

15. The system of claim 13, wherein:
the predetermined resource-load threshold is one of a set of predetermined thresholds correlated with a set of server resource loads; and
the selection module selects the common cipher for encrypted communication by selecting the common cipher based at least in part on which of the set of predetermined thresholds the resource load at the server exceeds.

16. The system of claim 13, wherein the selection module selects the common cipher for encrypted communication by:
identifying a required resource load for the common cipher; and
determining whether the resource-load measurement satisfies the required resource load.

17. The system of claim 13, wherein the selection module categorizes each cipher in the server list of ciphers according to a required resource load for the cipher.

18. The system of claim 13, wherein the risk factor indicating the degree of risk posed by the client comprises a reputation of the client.

19. The system of claim 13, wherein the selection module selects the common cipher by allowing use of a cipher categorized below a safety threshold based on the risk measurement indicating that the risk factor does not exceed the predetermined risk threshold.

20. A non-transitory computer-readable medium comprising one or more computer-readable instructions that, when executed by at least one processor of a computing device, cause the computing device to:

receive, at a server and from a client, a request to communicate according to a cipher for encryption, the request containing a client list of ciphers available at the client;

identify a server list of ciphers available at the server;

measure, in response to receiving the request, a risk factor indicating a degree of risk posed by the client, wherein:
the risk measurement indicates that the risk factor does not exceed a predetermined risk threshold;
the risk factor comprising at least one of:
a geolocation of the client;
an Internet protocol address of the client;
a time of day of the request from the client;

measure, in response to receiving the request, a resource load at the server that comprises a measurement of computational processing power at the server;

determine whether the resource-load measurement exceeds a predetermined resource-load threshold;

in response to determining that the resource-load measurement exceeds the predetermined resource-load threshold, select from both the client list and the server list a common cipher that has a lower level of complexity than at least one other common cipher for encrypted communication based on both the resource-load measurement exceeding the predetermined resource-load threshold and the risk factor not exceeding the predetermined risk threshold;

in response to determining that the resource-load measurement does not exceed the predetermined resource-load threshold, select from both the client list and the server list, based on both the resource-load measurement not exceeding the predetermined resource-load threshold and the risk factor not exceeding the predetermined risk threshold, a common cipher that has a higher level of complexity than the common cipher that would have been selected had the resource-load measurement exceeded the predetermined resource-load threshold;

encrypt communication between the server and the client using the selected common cipher;

transmit the communication between the server and the client that was encrypted using the selected common cipher.

* * * * *